(12) United States Patent
Johnson et al.

(10) Patent No.: US 8,006,297 B2
(45) Date of Patent: Aug. 23, 2011

(54) METHOD AND SYSTEM FOR COMBINED SECURITY PROTOCOL AND PACKET FILTER OFFLOAD AND ONLOAD

(75) Inventors: Darrin P. Johnson, San Jose, CA (US); Kais Belgaied, Sunnyvale, CA (US); Darren J. Reed, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1154 days.

(21) Appl. No.: 11/789,612

(22) Filed: Apr. 25, 2007

(65) Prior Publication Data

US 2008/0271134 A1 Oct. 30, 2008

(51) Int. Cl.
G06F 9/00 (2006.01)
G06F 15/16 (2006.01)
G06F 17/00 (2006.01)
H04L 29/06 (2006.01)

(52) U.S. Cl. ............. 726/15; 726/11; 713/153; 713/154
(58) Field of Classification Search .................... 726/15; 713/154
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,017,042 B1* | 3/2006 | Ziai et al. ...................... | 713/161 |
| 7,046,665 B1 | 5/2006 | Walrand et al. | |
| 7,051,365 B1* | 5/2006 | Bellovin ......................... | 726/11 |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,389,358 B1* | 6/2008 | Matthews et al. ............. | 709/238 |
| 2002/0091921 A1* | 7/2002 | Kunzinger ..................... | 713/153 |
| 2003/0037154 A1 | 2/2003 | Poggio et al. | |
| 2003/0126468 A1* | 7/2003 | Markham ....................... | 713/201 |
| 2003/0131228 A1* | 7/2003 | Twomey ........................ | 713/153 |
| 2004/0120528 A1* | 6/2004 | Elliott et al. ................... | 380/278 |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |

(Continued)

OTHER PUBLICATIONS

Y. Rekhter et al. RFC 1919: Address Allocation for Private Internets. Feb. 1996. IETF. p. 1-8.*

(Continued)

*Primary Examiner* — Christian LaForgia
(74) *Attorney, Agent, or Firm* — Osha • Liang LLP (57) ABSTRACT

A network interface card (NIC) includes a security association database (SADB) comprising a plurality of security associations (SAs), a cryptographic offload engine configured to decrypt a packet using one of the plurality of SAs, a security policy database (SPD) comprising a plurality of security policies (SPs) and a plurality of filter policies, and a policy engine configured to determine an admittance of the packet using one of the plurality of SPs from the SPD and apply one of the plurality of filter policies to the packet.

21 Claims, 7 Drawing Sheets

U.S. PATENT DOCUMENTS

| | | |
|---|---|---|
| 2005/0138620 A1 | 6/2005 | Lewites |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0070122 A1* | 3/2006 | Bellovin ............... 726/14 |
| 2006/0174324 A1 | 8/2006 | Zur et al. |

OTHER PUBLICATIONS

Tripathi, S.; "Solaris Networking—The Magic Revealed (Part I)"; Sunay Tripathi's Solaris Networking Weblog; Nov. 14, 2005, 22 pages.

Tripathi, S.; "CrossBow: Solaris Network Virtualization and Resource Control"; Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 22 pages.

Dovrolis, C., Thayer, B. and Ramanathan, P: "HIP: Hybrid Interrupt—Polling for the Network Interface", ACM SIGOPS Operating Systems Review, vol. 35, Iss. 4, Oct. 2001, (11 Pages).

* cited by examiner

METHOD AND SYSTEM FOR COMBINED SECURITY PROTOCOL AND PACKET FILTER OFFLOAD AND ONLOAD

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; and "Shared and Separate Network Stack Instances" with U.S. application Ser. No. 11/489,933.

The present application contains subject matter that may be related to the subject matter in the following U.S. applications filed on Nov. 28, 2006, and assigned to the assignee of the present application: "Virtual Network Testing and Deployment using Network Stack Instances and Containers" with U.S. application Ser. No. 11/605,114; and "Method and System for Creating A Demilitarized Zone using Network Stack Instances" with U.S. application Ser. No. 11/642,427 filed on Dec. 20, 2006.

The present application contains subject matter that may be related to the subject matter in the following U.S. application filed on Dec. 20, 2006, and assigned to the assignee of the present application: "Network Stack Instance Architecture with Selection of Transport Layers" with U.S. application Ser. No. 11/642,490; "Method and System for Virtual Routing Using Containers" with U.S. application Ser. No. 11/642,756.

The present application contains subject matter that may be related to the subject matter in the following U.S. applications filed on Mar. 30, 2007, and assigned to the assignee of the present application: "Method and System for Security Protocol Partitioning and Virtualization" with U.S. application Ser. No. 11/731,601; "Method and System for Inheritance of Network Interface Card Capabilities" with U.S. application Ser. No. 11/731,458.

The present application contains subject matter that may be related to the subject matter in the following U.S. applications filed on Apr. 24, 2007, and assigned to the assignee of the present application: "Method and System for Virtualization of Packet Encryption Offload and Onload" with U.S. application Ser. No. 11/789,337.

BACKGROUND

Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header includes information regarding the source address, destination address, size, transport protocol used to transmit the packet, and various other identification information associated with the packet. The payload includes the actual data to be transmitted from the network to the receiving system.

Each of the packets sent between the sending system and receiving system is typically associated with a connection. The connection ensures that packets from a given process on the sending system reach the appropriate process on the receiving system. The connection may also be secured by encrypting and authenticating the packets before transmission. Packets received by the receiving system (via a NIC associated with the receiving system) are analyzed by a classifier to determine the connection associated with the packet. If the packets are encrypted, the packets may be decrypted by the CPU, or by a cryptographic offload engine located elsewhere on the receiving system.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a network interface card (NIC), comprising a security association database (SADB) comprising a plurality of security associations (SAs), a cryptographic offload engine configured to decrypt a packet using one of the plurality of SAs, a security policy database (SPD) comprising a plurality of security policies (SPs) and a plurality of filter policies, and a policy engine configured to determine an admittance of the packet using one of the plurality of SPs from the SPD and apply one of the plurality of filter policies to the packet.

In general, in one aspect, the invention relates to a network interface card (NIC), comprising a security association database (SADB) comprising a plurality of security associations (SAs), a cryptographic offload engine configured to decrypt a packet using one of the plurality of SAs, a security policy database (SPD) comprising a plurality of security policies (SPs), a policy engine configured to determine an admittance of the packet using one of the plurality of SPs from the SPD, a filter database comprising a plurality of filter policies, and a filter engine configured to apply one of the plurality of filter policies to the packet.

In general, in one aspect, the invention relates to a method for processing a packet, comprising receiving the packet in a network interface card (NIC), obtaining a security association (SA) from a security association database (SADB) on the NIC, decrypting the packet using the SA, obtaining a security policy (SP) from a security policy database (SPD) on the NIC, determining an admittance of the packet based on the SP, obtaining a filter policy from a filter database on the NIC, applying the filter policy to the packet to obtain a filter result, and performing one selected from a group consisting of sending the packet to a host operatively connected to the NIC based on the filter result, wherein the packet is processed by the host, and dropping the packet based on the filter result, wherein the packet is processed by the NIC prior to being dropped.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to process packets. Specifically, embodiments of the invention provide a method and system to offload security protocol, packet filter, and transport protocol processing of packets. The security protocol, packet filter, and transport protocol processing may be provided in whole or in part by a NIC operatively connected to a host. The NIC may include a cryptographic offload engine, a policy engine, and a transport protocol offload engine. Further, the NIC may apply a packet filter or firewall using a filter engine, or the NIC may implement packet filter functionality using the policy engine. The security protocol may include, for example, Internet Protocol Security (IPsec). The packet filter may include a network layer firewall such as IPfilter. Further, the transport protocol processing may include TCP and IP processing.

Figure 1:
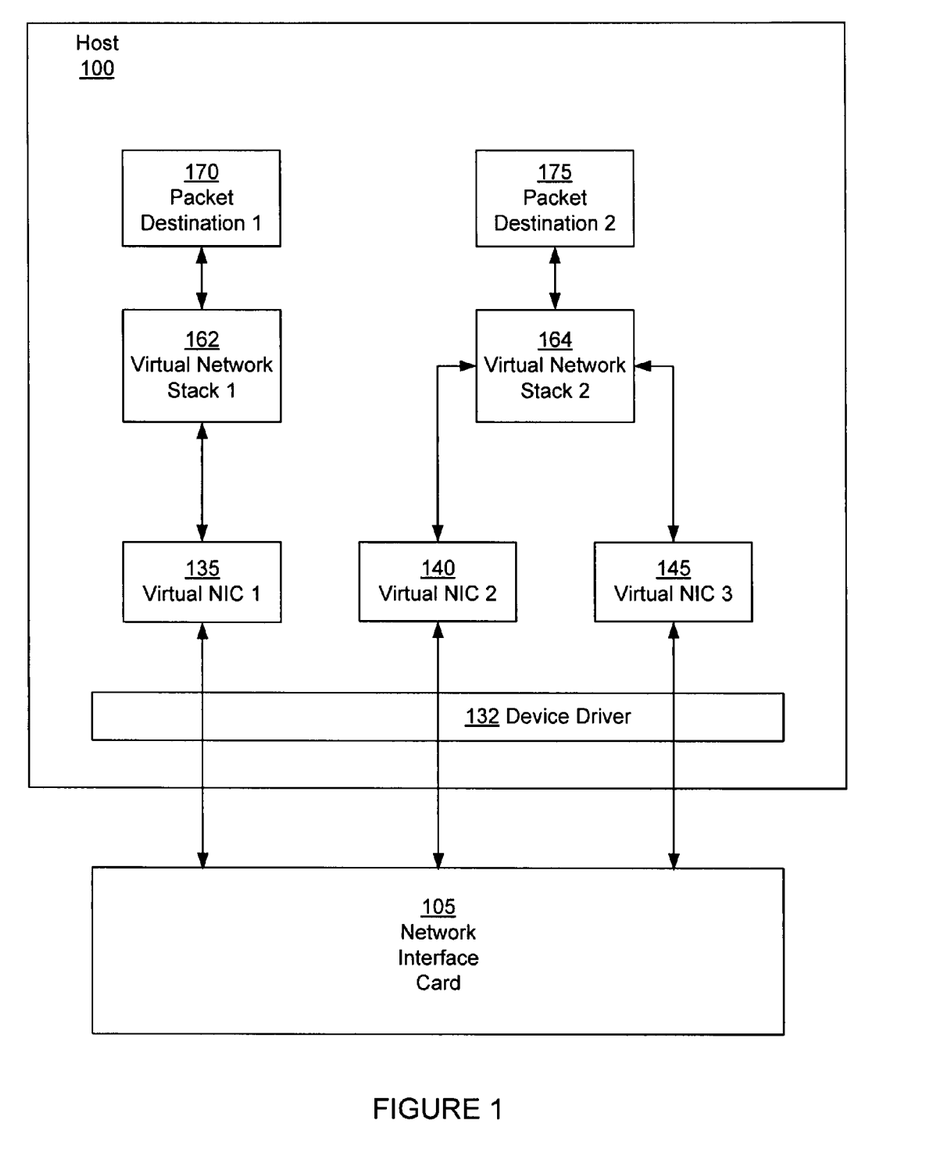
FIGS. 1, 2A, and 2B show schematic diagrams in accordance with one or more embodiments of the invention.

FIG. 1 shows a schematic diagram of a system in accordance with one or more embodiments of the invention. As shown in FIG. 1, the system includes a host (100), a network interface card (NIC) (105), a device driver (132), multiple virtual network stacks (e.g., virtual network stack 1 (162), virtual network stack 2 (164)), multiple virtual NICs (e.g., virtual NIC 1 (135), virtual NIC 2 (140), virtual NIC 3 (145)), and multiple packet destinations (e.g., packet destination 1 (170), packet destination 2 (175)). Each of these components is described below.

In one embodiment of the invention, the NIC (105) provides an interface between the host (100) and a network (not shown) (e.g., a local area network, a wide area network, a wireless network, etc.). More specifically, the NIC (105) includes a network interface (NI) (i.e., the hardware on the NIC used to interface with the network) configured to receive packets from the network and send packets to the network. For example, the NI may correspond to an RJ-45 connector, a wireless antenna, etc. The packets received by the NI are forwarded to other components on the NIC (105) for processing. The NIC (105) is explained in further detail with respect to FIGS. 2A and 2B below.

In one or more embodiments of the invention, the host (100) may include a device driver (132) and one or more virtual NICs (e.g., virtual NIC 1 (135), virtual NIC 2 (140), virtual NIC 3 (145)). In one embodiment of the invention, the device driver (132) provides an interface between the NIC (105) and the host (100). More specifically, the device driver (132) exposes the NIC (105) to the host (100). In one embodiment of the invention, each of the virtual NICs (e.g., virtual NIC 1 (135), virtual NIC 2 (140), virtual NIC 3 (145)) is associated with one or more hardware resources on the NIC (105). In other words, a virtual NIC (e.g., virtual NIC 1 (135), virtual NIC 2 (140), virtual NIC 3 (145)) receives incoming packets from the NIC (105). Similarly, in one or more embodiments of the invention, outgoing packets are sent from a virtual NIC (e.g., virtual NIC 1 (135), virtual NIC 2 (140), virtual NIC 3 (145)) to the NIC (105), which temporarily stores the packet before transmitting the packet over the network.

In one or more embodiments of the invention, the virtual NICs (e.g., virtual NIC 1 (135), virtual NIC 2 (140), virtual NIC 3 (145)) are operatively connected to packet destinations (e.g., packet destination 1 (170), packet destination 2 (175)), which include containers and/or applications, via virtual network stacks (e.g., virtual network stack (162), virtual network stack 2 (164)). The virtual NICs (e.g., virtual NIC 1 (135), virtual NIC 2 (140), virtual NIC 3 (145)) provide an abstraction layer between the NIC (105) and the packet destinations (e.g., packet destination 1 (170), packet destination 2 (175)) on the host (100). More specifically, each virtual NIC (e.g., virtual NIC 1 (135), virtual NIC 2 (140), virtual NIC 3 (145)) operates like a NIC (105). For example, in one embodiment of the invention, each virtual NIC (e.g., virtual NIC 1 (135), virtual NIC 2 (140), virtual NIC 3 (145)) is associated with one or more Internet Protocol (IP) addresses, associated with one or more MAC addresses, optionally associated with one or more ports, and optionally configured to handle one or more protocol types. Thus, while the host (100) may be operatively connected to a single NIC (105), packet destinations (e.g., packet destination 1 (170), packet destination 2 (175)), such as containers or applications, executing on the host (100) operate as if the host (100) is bound to multiple NICs.

In one embodiment of the invention, each virtual network stack (e.g., virtual network stack (162), virtual network stack 2 (164)) includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks (e.g., virtual network stack (162), virtual network stack 2 (164)) correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). In one or more embodiments of the invention, the virtual network stacks (e.g., virtual network stack (162), virtual network stack 2 (164)) implement an IP layer (not shown) and a TCP layer (not shown).

Figure 2A:
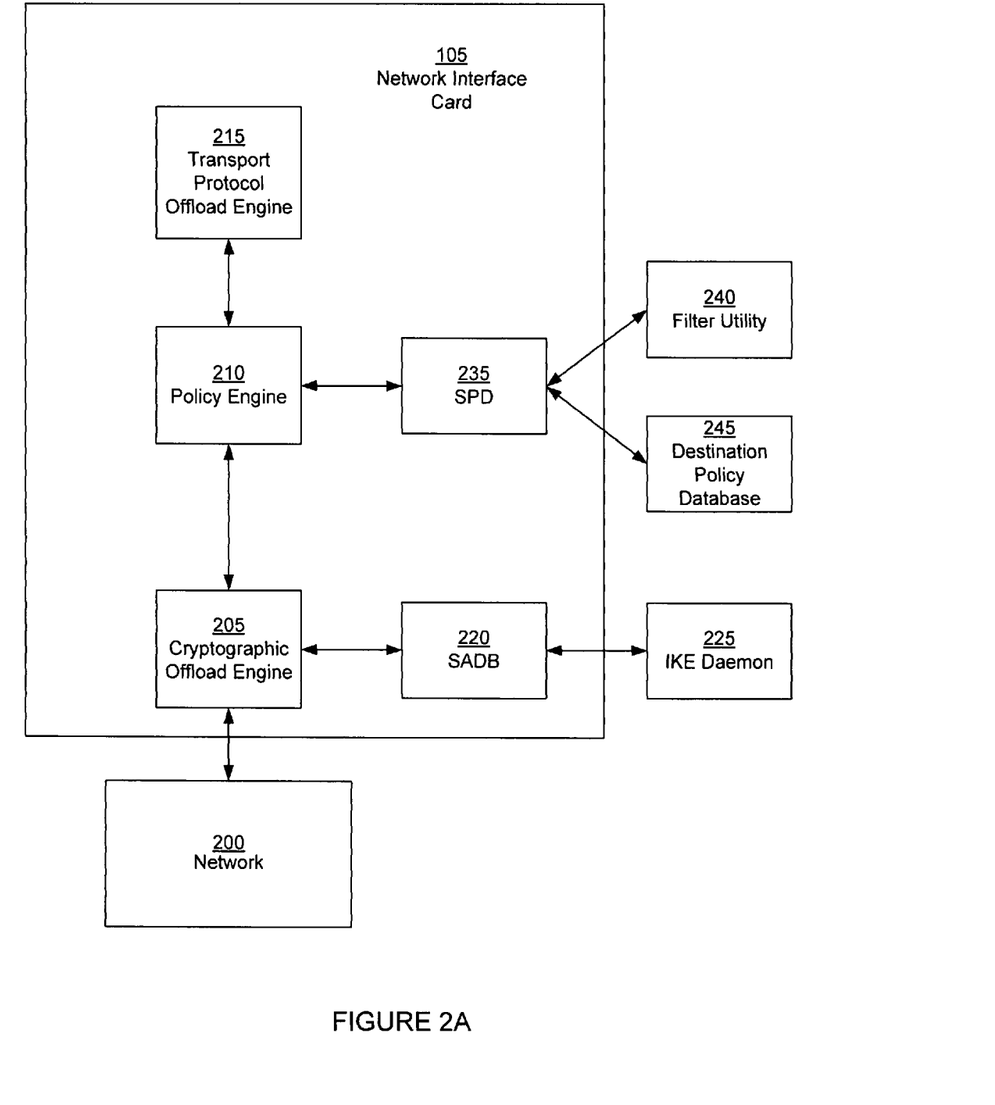

FIG. 2A shows a schematic diagram of a system for processing packets in accordance with one or more embodiments of the invention. In one or more embodiments of the invention, the system of FIG. 2A is used to implement offloading of security protocol, packet filter, and transport protocol processing. In addition, the offloading may be applied to the system of FIG. 1, as explained below. The system of FIG. 2A includes a NIC (105) (corresponding to NIC (105) in FIG. 1). The NIC (105) further includes a cryptographic offload engine (205), a policy engine (210), a transport protocol offload engine (215), a security association database (SADB) (220), and a security policy database (SPD) (235). Additionally, the NIC (105) may be operatively connected to a host, such as the host of FIG. 1. Each of these components is described in further detail below.

As mentioned previously, the NIC (105) is responsible for sending and receiving packets to and from other network devices on a network (200). To secure the transmission of packets over the network (200), packets in the NIC (105) may be encrypted/authenticated before being transmitted over the network (200) and/or decrypted/verified after receipt from another host (or other device operatively connected to the network) on the network (200). In one or more embodiments of the invention, a security protocol is implemented to encrypt, decrypt, and/or authenticate packets sent and received by the NIC (105) over the network (200). In one or more embodiments of the invention, the security protocol used to encrypt, decrypt, and/or authenticate packets sent and received by the NIC (105) over the network (200) is Internet Protocol Security (IPsec). The IPsec security model is described in Request for Comments (RFC) 4301-4309, all of which are incorporated by reference.

Similarly, a firewall may also be used to protect the integrity of network traffic between the NIC (105) and other devices on the network (200). Specifically, a firewall may be used by the NIC (105) to permit, deny, and/or proxy network connections between the NIC (105) and other devices on the network (200). In one or more embodiments of the invention, the firewall may be implemented using a packet filter. The packet filter may also include network address translation (NAT) services. In one or more embodiments of the invention, IPFilter is used to provide packet filtering and NAT services to packets sent and received by the NIC (105) over the network (200). NAT functionality is described in RFC 1918, which is incorporated by reference. Those skilled in the art will appreciate that other firewall and/or NAT utilities, such as iptables and OpenBSD Packet Filter, may also be used to implement the packet filter.

In one or more embodiments of the invention, encryption and decryption of packets, as well as implementation of security policies, may be executed using a central processing unit (CPU) on a host associated with the NIC (105). For example, IPsec Authenticating Header (AH), Encapsulating Security Payload (ESP), and packet encryption and decryption may be carried out using a CPU on the host of FIG. 1. Alternatively, IPsec AH, ESP, encryption and decryption may be partially or wholly implemented using a cryptographic offload engine (205) and/or a policy engine (210) located on the NIC (105). In one or more embodiments of the invention, a processor (not shown) and memory (not shown) on the NIC (105) are used to implement the cryptographic offload engine (205), policy engine (210), SADB (220), and SPD (235).

As shown in FIG. 2A, the cryptographic offload engine (205) is associated with an SADB (220). Similarly, the policy engine (210) is associated with an SPD (235). Further, the SADB (220) and SPD (235) may be divided into multiple SADB partitions and SPD partitions, respectively. SADB partitions and SPD partitions are described in U.S. patent application Ser. No. 11/731,601 entitled "Method and System for Security Protocol Partitioning and Virtualization," filed on Mar. 30, 2007, and incorporated herein by reference.

In one or more embodiments of the invention, the SADB (220) stores security associations (SAs) used to secure network traffic between the NIC (105) and other network devices over the network (200). In one or more embodiments of the invention, an SA corresponds to a logical connection that allows security information to be shared between two network entities to support secure communication. For example, an SA may be used to secure a network connection between the NIC (105) and another NIC on the network (200) using packet encryption and/or authentication. In addition, the SA may include one or more cryptographic keys, initialization vectors, and/or digital certificates. In other words, an SA corresponds to a group of security parameters for sharing information with another entity on the network (200). In one or more embodiments of the invention, the cryptographic offload engine (205) exchanges SAs in the SADB (220) with other hosts on the network (200). In addition, the cryptographic offload engine (205) may authenticate, encrypt, and/or decrypt incoming and outgoing packets using SAs in the SADB (220). In one or more embodiments of the invention, SAs in the SADB partitions (220) correspond to IPsec SAs.

In one or more embodiments of the invention, the SPD (235) stores security policies (SPs), which define access to packet destinations on a host operatively connected to the NIC (105), such as the host of FIG. 1. In one or more embodiments of the invention, an SP corresponds to a rule or set of rules that determine how packets in the NIC (105) are processed. For example, an SP may determine whether outgoing packets are to be authenticated or encrypted using the security protocol. In addition, an SP may determine whether incoming packets are allowed or denied access past the policy engine (210). An SP may further specify how packets which are denied access are processed. For example, the SP may dictate that packets denied access are dropped, or, alternatively, that the packets are stored for future reference. In one or more embodiments of the invention, the policy engine (210) is responsible for implementing the SPs stored in the SPD (235). In one or more embodiments of the invention, SPs in the SPD (235) correspond to IPsec SPs.

In one or more embodiments of the invention, the SADB (220) is associated with an IKE daemon (225) on the host. In one or more embodiments of the invention, SAs in the SADB partition (220) are created and maintained by the corresponding IKE daemon (225) in accordance with RFC 4301-4309, all of which are incorporated by reference.

In one or more embodiments of the invention, the SPD (235) is associated with a destination policy database (245) on the host. In one or more embodiments of the invention, SPs for a packet destination on the host are created and stored in the destination policy database (245). The SPs in the destination policy database (245) may be transferred to the SPD (235) to allow the policy engine (210) to access the SPs.

As shown in FIG. 2A, the SPD (235) is further associated with a filter utility (240) on the host. In one or more embodiments of the invention, the SPD (235) stores firewall rules from the filter utility (240). Further, the firewall rules in the SPD (235) may be accessed by the policy engine (210) to apply a packet filter and/or NAT services for incoming and outgoing packets. In other words, the policy engine (210) may offload packet filtering from the host onto the NIC (105). For example, firewall rules may be created using the filter utility (240) on the host. The firewall rules may then be transferred to the SPD (235) for use by the policy engine (210) to implement the firewall. In one or more embodiments of the invention, a network layer firewall, such as IPfilter, is implemented using the policy engine (210) of FIG. 2A.

In one or more embodiments of the invention, network layer processing and transport layer processing may be implemented on one or more virtual network stacks on the host, such as the virtual network stacks of FIG. 1. On the other hand, transport layer and network layer processing of packets may be partially or wholly provided by a transport protocol offload engine (215) on the NIC (105). In one or more embodiments of the invention, transport layer processing includes TCP and UDP processing of packets. In one or more embodiments of the invention, network layer processing includes IP processing of packets. In other words, network stack functionality may be provided by the transport protocol offload engine (215) in lieu of a software module on the host connected to the NIC (105). In one or more embodiments of the invention, a TCP offload engine (TOE) is used as the transport protocol offload engine (215) to process packets in accordance with transport layer protocols and/or network layer protocols.

In one or more embodiments of the invention, packets from a network (200) are received by the NIC (105). The packets are then sent to the cryptographic offload engine (205) for decryption, if the packets are encrypted. In one or more embodiments of the invention, encrypted packets in the cryptographic offload engine (205) may be decrypted using an SA from the SADB (220). Once the packets are decrypted, the packets are sent to the policy engine (210), where one or more SPs and/or firewall rules associated with the packets may be retrieved. Based on the SP(s) and/or firewall rule(s), the packets may be admitted or denied access to the host connected to the NIC (105). For example, the SP(s) and/or firewall rule(s) may block all packets that are not from a local area network (LAN) associated with the NIC (105). Blocked packets may then be handled according to the SP(s) and/or firewall rule(s). For example, the blocked packets may be dropped, or the blocked packets may be stored for future reference and/or analysis.

If the packets are admitted into the system, NAT may be applied to the packets by the policy engine (210). In one or more embodiments of the invention, NAT involves rewriting the destination address of incoming packets and the source address of outgoing packets. The packets may then be sent to the transport protocol offload engine (215) for network and/or transport layer processing, or the packets may bypass the transport protocol offload engine (215) entirely if the packets are to be processed by one or more virtual network stacks on the host. After transport and network layer processing by the transport protocol offload engine (215) and/or virtual network stacks, the packets are sent to the corresponding packet destinations on the host.

Figure 2B:
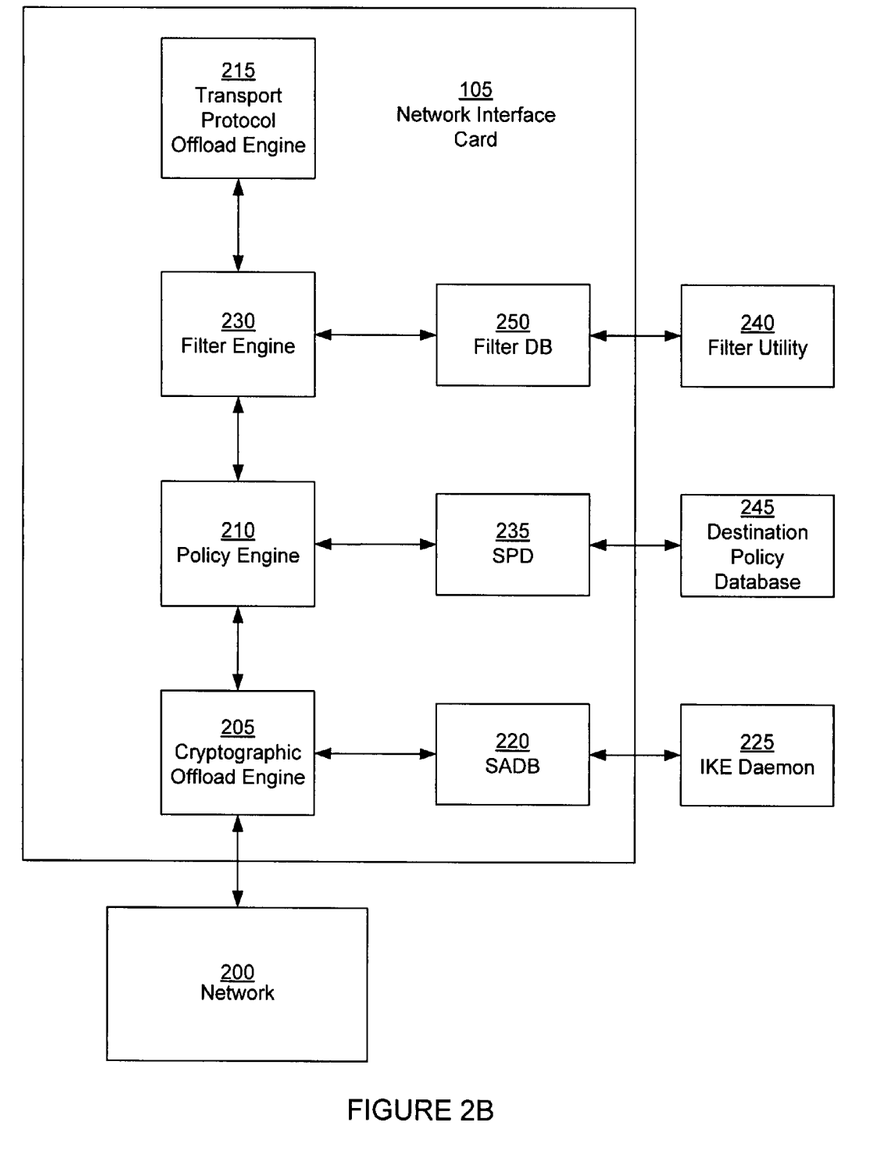

FIG. 2B shows a schematic diagram of a system for processing outgoing packets in accordance with one or more embodiments of the invention. In one or more embodiments of the invention, the system of FIG. 2B is used to implement offload of a security protocol, packet filter, and transport protocol processing. In addition, the offload may be applied to the system of FIG. 1, as explained below. The system of FIG. 2B includes a NIC (105) (corresponding to NIC (105) in FIG. 1). The NIC (105) further includes a cryptographic offload engine (205), a policy engine (210), a filter engine (230), a transport protocol offload engine (215), a security association database (SADB) (220), a security policy database (SPD) (235), and a filter database (DB) (250).

In one or more embodiments of the invention, the above components of the NIC (105) correspond to the same components in FIG. 2A. However, the packet filter is implemented using the filter engine (230) instead of the policy engine (210). Similarly, firewall rules related to the packet filter and NAT may be stored in the filter DB (250) instead of the SPD (235). As with FIG. 2A, the packet filter may be configured using the filter utility (240) on the host. For example, an IPfilter firewall may be setup by an administrator using the filter utility (240). The IPfilter firewall may then be enforced by the filter engine (230) on the NIC (105). As a result, network layer firewall functionality may be applied to the packets by the NIC (105) instead of the host. Similarly, network and transport layer processing may be applied to the packets by the transport protocol offload engine (215) (e.g., a TOE) on the NIC (105) instead of a virtual network stack (e.g., virtual network stacks of FIG. 1) on the host.

Figure 3:
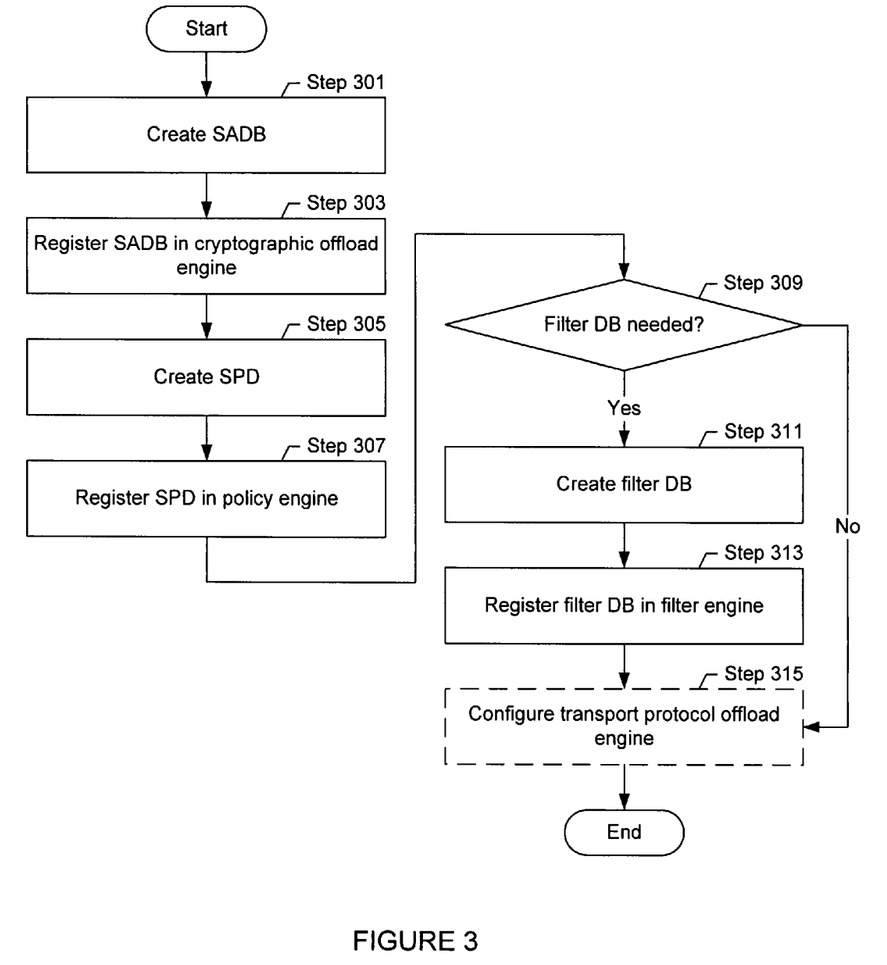
FIGS. 3-5 show flow diagrams in accordance with one or more embodiments of the invention.

FIG. 3 shows a flow diagram of NIC setup in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, the SADB is created (Step 301). As mentioned above, the SADB may store SAs for connections with packet destinations on a host. The SAs may also be accessible by a cryptographic offload engine located on a NIC attached to the host. Further, the SADB may include multiple SADB partitions. SADB partition creation is described in further detail with respect to U.S. patent application Ser. No. 11/731,601 entitled "Method and System for Security Protocol Partitioning and Virtualization," filed on Mar. 30, 2007, assigned to the same entity and incorporated herein by reference.

The SADB is also registered in a cryptographic offload engine (Step 303), which may be located on a NIC operatively connected to the host. The SADB may be registered using a process executing on the host. In addition, the SADB may be associated with an IKE daemon on the host, which may begin populating the SADB with SAs for the packet destination.

An SPD is also created (Step 305). In one or more embodiments of the invention, the SPD is also associated with packet destinations on the host. In one or more embodiments of the invention, the SPD stores SPs associated with the packet destinations. Specifically, the SPs define how incoming and outgoing packets are handled. For example, the SPs may specify encryption or authentication of certain outgoing packets, decryption or verification of incoming packets, and admittance or denial of packet entry. As with the SADB, the SPD may include multiple SPD partitions. SPD partition creation is described in further detail with respect to U.S. patent application Ser. No. 11/731,601 entitled "Method and System for Security Protocol Partitioning and Virtualization" assigned to the same entity, filed on Mar. 30, 2007, and incorporated herein by reference.

The SPD is registered in a policy engine (Step 307), which may also be located on the NIC. In one embodiment of the invention, the SPD may be registered using a process executing on the host. In addition, the SPD may be associated with a destination policy database on the host, which may begin transferring SPs to the SPD from the host.

A determination is made regarding whether a filter DB is needed (Step 309). As described above, a packet filter may be implemented using the policy engine. Further, firewall rules and NAT parameters associated with the packet filter may be stored in the SPD and accessed by the policy engine to enforce a network layer firewall on the NIC. Alternatively, the packet filter may be implemented using a separate filter engine on the NIC. If a separate filter engine is used on the NIC, a filter DB may be necessary.

If the packet filter is implemented using a filter engine, a filter DB is created (Step 311). The filter DB may store firewall rules and NAT parameters for incoming and outgoing packets. Further, the filter DB may be populated with rules and/or parameters using a filter utility on the host. The filter DB may also be registered with the filter engine (Step 313) using a process executing on the host. As with the cryptographic offload engine and policy engine, the filter engine may be located on the NIC and used to offload packet filtering from the host. If a filter DB is not necessary, Steps 311-313 are skipped since the packet filter may be implemented using the policy engine and SPD.

Optionally, the transport protocol offload engine may be configured (Step 315). Because transport and network layer processing of packets may occur on the host, the transport protocol offload engine may or may not be used in the NIC. As a result, the transport protocol offload engine may not need configuration if the transport protocol offload engine is not used. However, if the transport protocol offload engine is used at least in part for transport and/or network layer processing of packets, the transport protocol offload engine may be configured to process packets in accordance with protocols used by other devices on the network to communicate with the host, such as TCP, UDP, IP, etc.

Figure 4:
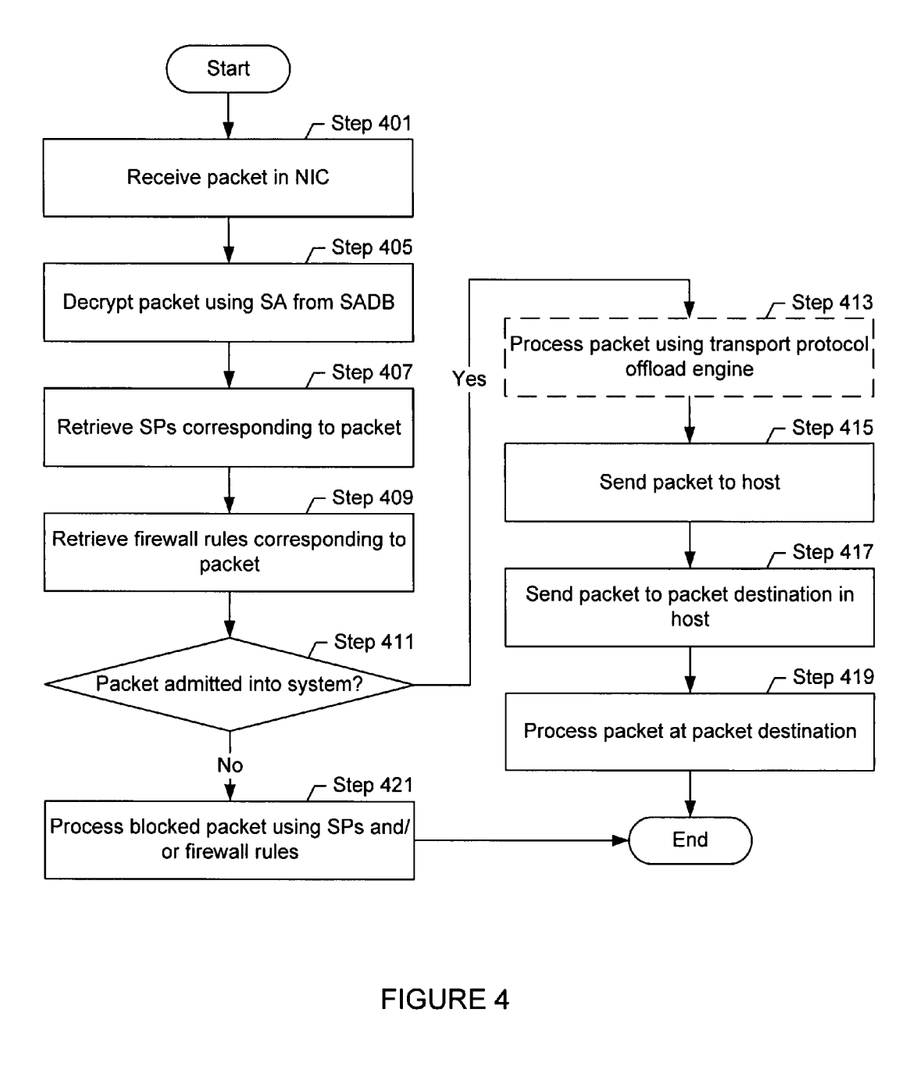

FIG. 4 shows a flow diagram of incoming packet processing in accordance with one or more embodiments of the invention. In one or more embodiments of the invention, one or more of the steps described below may be omitted, repeated, and/or performed in a different order. Accordingly, the specific arrangement of steps shown in FIG. 4 should not be construed as limiting the scope of the invention.

Initially, a packet is received in a NIC (Step 401). The packet may be received over a network connection from another device on the network, such as a host. The packet is decrypted using an SA from an SADB on the NIC (Step 405). Alternatively, the decryption may be skipped if the packet is received as clear text. SPs corresponding to the packet are also retrieved (Step 407). Additionally, firewall rules corresponding to the packet may also be retrieved (Step 409). As described with respect to FIGS. 2A and 2B, the firewall rules and SPs may be stored in an SPD, or the firewall rules may be stored in a separate filter DB. The firewall rules may also include NAT parameters for changing the destination IP address of the packet. Further, the firewall rules may correspond to a network layer firewall, such as IPfilter. Similarly, the SAs and SPs may correspond to a security protocol such as IPsec.

A determination is made, based on the firewall rules and/or SPs, about whether the packet is admitted into the system (Step 411). For example, the packet may be blocked or admitted based on source and/or destination IP address, packet contents, etc. In addition, an SP may block the packet's entry into the system even if the packet includes a security parameter index (SPI) and destination address for a packet destination in the system. If the packet is blocked from entering the system, the blocked packet is processed according to the SPs and/or firewall rules (Step 421). For example, the packet may be dropped, or the packet may be stored in part or in whole for further analysis and/or future reference.

If the packet is admitted into the system, the packet may be processed by a transport protocol offload engine on the NIC (Step 413). As mentioned above, the transport protocol offload engine may provide transport layer and/or network layer processing for incoming and outgoing packets. Alternatively, transport and/or network layer processing may be performed by a virtual network stack on the host when the packet is sent to the host (Step 415). Regardless of where the packet is processed with respect to the transport layer and network layer, the packet is sent to a corresponding packet destination on the host (Step 417), where the packet is processed (Step 419) by the packet destination.

Figure 5:
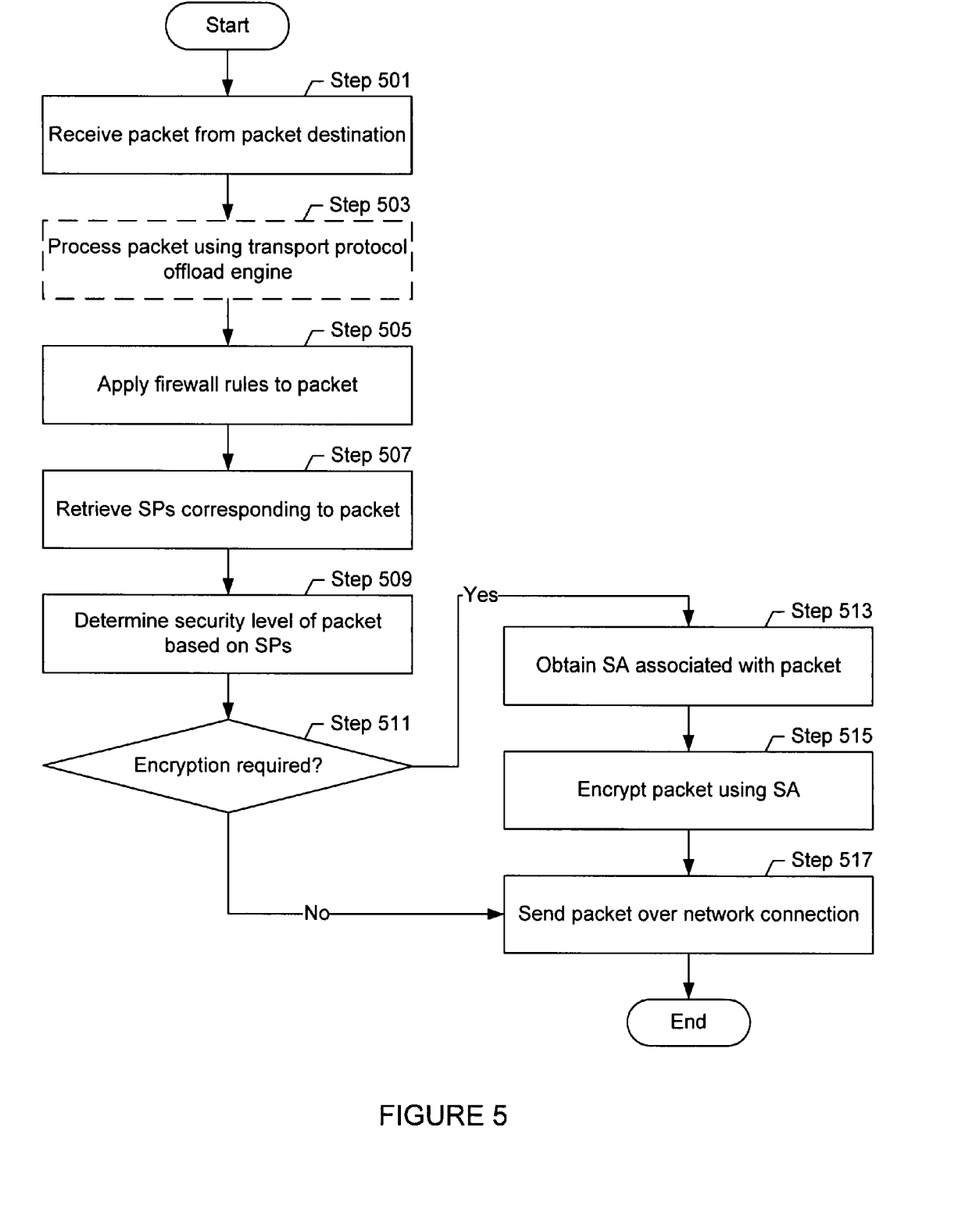

FIG. 5 shows a flow diagram of outgoing packet processing in accordance with one or more embodiments of the invention. In one or more embodiments of the invention, one or more of the steps described below may be omitted, repeated, and/or performed in a different order. Accordingly, the specific arrangement of steps shown in FIG. 5 should not be construed as limiting the scope of the invention.

Initially, the packet is received from a packet destination (Step 501). As mentioned previously, the packet destination may include an application, such as a web server or enterprise application. The packet destination may also include a container, or an isolated execution environment within the host. The packet may be processed by a transport protocol offload engine on the NIC (Step 503). Alternatively, the packet may be processed by a virtual network stack on the host prior to arriving at the NIC, or the packet may be processed by a combination of the virtual network stack and the transport protocol offload engine. As mentioned above, the transport protocol offload engine may provide transport layer and/or network layer processing of the packet.

Firewall rules are applied to the packet (Step 505). As described above, the firewall rules may implement a packet filter. The firewall rules may permit or block the packet from leaving the NIC. In addition, if NAT is applied to the packet, the source IP address of the packet may be changed/modified.

SPs corresponding to the packet are retrieved (Step 507). The SPs may be found in an SPD on the NIC. In one embodiment of the invention, the SPs are used to determine the security level of the packet (Step 509). In one or more embodiments of the invention, the security level of the packet corresponds to the sensitivity of information contained within the packet's payload. For example, a packet containing a user's login and/or password for a financial application may be associated with a higher security level than a packet containing a request for data from a publicly accessible webpage. In one or more embodiments of the invention, the SPs may dictate whether the packet is to be authenticated, encrypted (Step 511), or otherwise processed before being sent over the network.

If the packet requires encryption, an SA associated with the packet is obtained (Step 513). Similar to the SPs, the SA may be found in an SADB on the NIC. The packet is encrypted using the SA (Step 515) and sent over a network connection (Step 517). If the packet does not require encryption, the packet is sent over the network connection (Step 517) without retrieving the SA or encrypting the packet using the SA.

Figure 6:
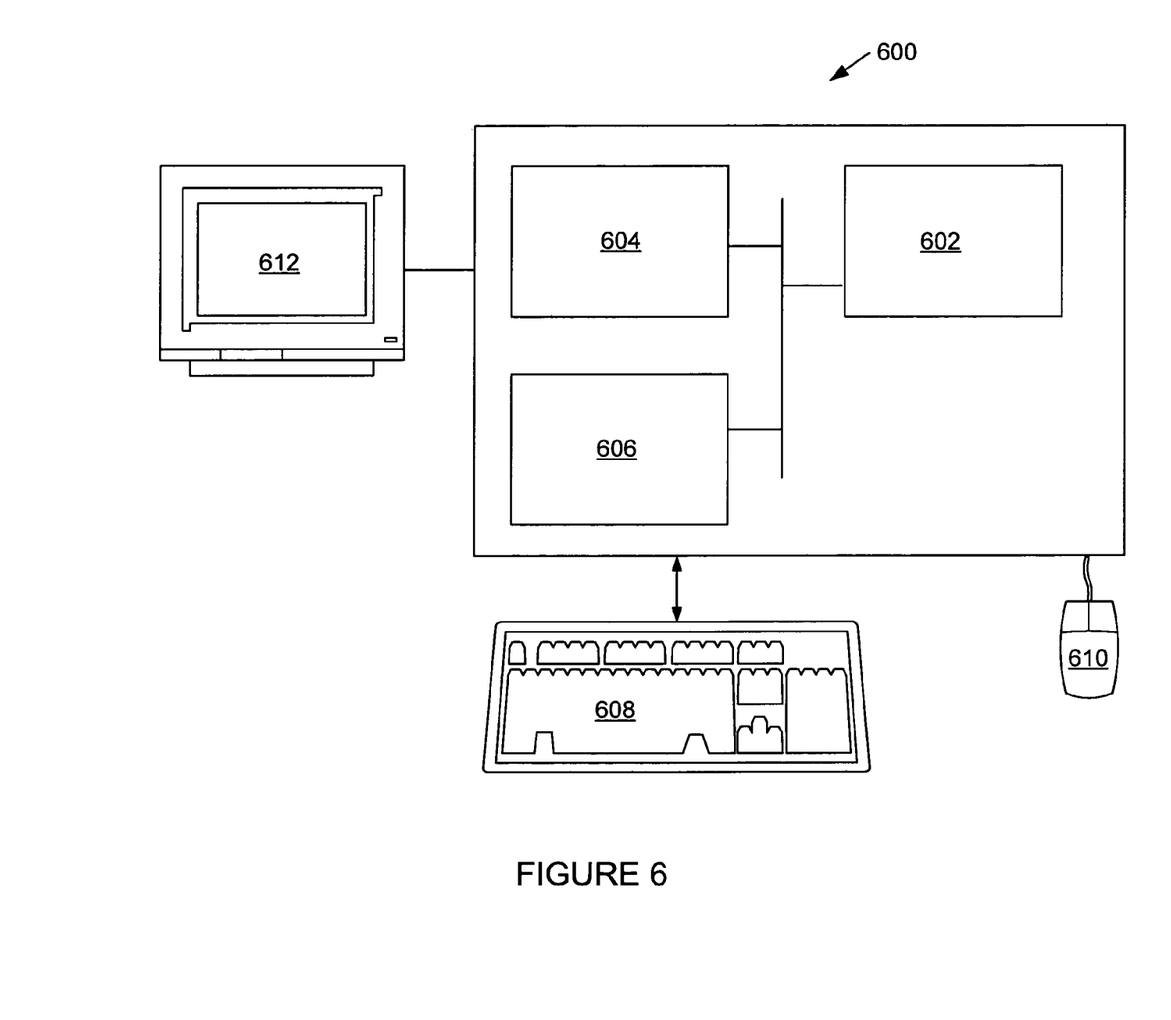
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., cryptographic offload engine, policy engine, transport protocol offload engine, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network interface card (NIC), comprising:
   a security association database (SADB) comprising a plurality of security associations (SAs) configured to decrypt received packets and encrypt sent packets;
   a cryptographic offload engine operatively connected to the SADB, configured to:
   receive an encrypted packet from the network, wherein the encrypted packet comprises a first source address and a destination address,
   decrypt the encrypted packet using one of the plurality of SAs to obtain a decrypted packet, and
   send the decrypted packet to a policy engine;
   a security policy database (SPD), operatively connected to the policy engine, comprising a plurality of security policies (SPs) configured to define access to packet destinations on a host and a plurality of firewall policies configured to determine access to the host, wherein the host is operatively connected to the NIC; and a policy engine configured to:
- receive the encrypted packet from the cryptographic offload engine,
- determine a packet destination on the host using the destination address and one of the plurality of SPs from the SPD,
- determine admittance of the decrypted packet to the host using one of the plurality of firewall policies,
- modify the first source address to a second source address using the firewall policies to obtain a modified decrypted packet, and
- send the modified decrypted packet to the destination address in the host.

2. The NIC of claim 1, further comprising:
a transport protocol offload engine configured to apply transport protocol processing to the modified decrypted packet.

3. The NIC of claim 2, wherein the transport protocol offload engine applies transmission control protocol (TCP) processing to the modified decrypted packet.

4. The NIC of claim 1, wherein the SADB comprises a plurality of SADB partitions and wherein each of the SADB partitions comprises at least one of the plurality of SAs.

5. The NIC of claim 1, wherein the SPD comprises a plurality of SPD partitions and wherein each of the SPD partitions comprises at least one of the plurality of SPs.

6. The NIC of claim 1, wherein the SPD is associated with a filter utility on the host.

7. The NIC of claim 1, wherein the SPD is associated with a destination policy database on the host.

8. A method for processing a packet, comprising:
- receiving the packet in a network interface card (NIC), wherein the packet comprises a first source address and a destination address;
- obtaining a security association (SA) from a security association database (SADB) on the NIC;
- decrypting, by a cryptographic offload engine, the packet using the SA to obtain a decrypted packet;
- obtaining a security policy (SP) from a security policy database (SPD) on the NIC;
- determining a packet destination of the decrypted packet based on the SP;
- obtaining a firewall policy from a filter database on the NIC;
- determining admittance of the decrypted packet to a host using the firewall policy,
- modifying the first source address to a second source address using the firewall policy to obtain a modified decrypted packet, and
- sending the modified decrypted packet to the destination address on the host, wherein the modified decrypted packet is processed by the host.

9. The method of claim 8, further comprising:
processing the modified decrypted packet using a transport protocol offload engine on the NIC prior to sending the modified decrypted packet to the host.

10. The method of claim 8, wherein the SADB is associated with an internet key exchange (IKE) daemon on the host.

11. The method of claim 8, wherein the SADB is associated with the cryptographic offload engine on the NIC.

12. The method of claim 8, wherein the SPD is associated with a policy engine on the NIC.

13. The method of claim 8, wherein the filter database is associated with a filter utility on the host.

14. The method of claim 8, wherein the filter database is associated with a filter engine on the NIC.

15. A non-transitory computer readable storage medium comprising computer readable code that, when executed by a processor, is configured to perform a method, the method comprising:
- receiving a packet in a network interface card (NIC), wherein the packet comprises a first source address and a destination address;
- obtaining a security association (SA) from a security association database (SADB) on the NIC;
- decrypting, by a cryptographic offload engine, the packet using the SA to obtain a decrypted packet;
- obtaining a security policy (SP) from a security policy database (SPD) on the NIC;
- determining a packet destination of the decrypted packet based on the SP;
- obtaining a firewall policy from a filter database on the NIC;
- determining admittance of the decrypted packet to a host using the firewall policy,
- modifying the first source address to a second source address using the firewall policy to obtain a modified decrypted packet, and
- sending the modified decrypted packet to the destination address on the host, wherein the modified decrypted packet is processed by the host.

16. The non-transitory computer readable storage medium of claim 15, further comprising:
processing the modified decrypted packet using a transport protocol offload engine on the NIC prior to sending the modified decrypted packet to the host.

17. The non-transitory computer readable storage medium of claim 15, wherein the SADB is associated with an internet key exchange (IKE) daemon on the host.

18. The non-transitory computer readable storage medium of claim 15, wherein the SADB is associated with a cryptographic offload engine on the NIC.

19. The non-transitory computer readable storage medium of claim 15, wherein the SPD is associated with a policy engine on the NIC.

20. The non-transitory computer readable storage medium of claim 15, wherein the filter database is associated with a filter utility on the host.

21. The non-transitory computer readable storage medium of claim 15, wherein the filter database is associated with a filter engine on the NIC.

* * * * *